(12) United States Patent
Moshammer

(10) Patent No.: US 12,529,396 B2
(45) Date of Patent: Jan. 20, 2026

(54) STATICALLY OPTIMIZED HYBRID ROLLER BEARING

(71) Applicant: igus GmbH, Cologne (DE)

(72) Inventor: Horst Moshammer, Linz am Rhein (DE)

(73) Assignee: igus GmbH, Cologne (DE)

( * ) Notice: Subject to any disclaimer, the term of this patent is extended or adjusted under 35 U.S.C. 154(b) by 0 days.

(21) Appl. No.: 18/286,118

(22) PCT Filed: Apr. 8, 2022

(86) PCT No.: PCT/EP2022/059521
§ 371 (c)(1),
(2) Date: Oct. 17, 2023

(87) PCT Pub. No.: WO2022/218881
PCT Pub. Date: Oct. 20, 2022

(65) Prior Publication Data
US 2024/0183390 A1 Jun. 6, 2024

(30) Foreign Application Priority Data
Apr. 12, 2021 (DE) .................... 20 2021 101 951.4

(51) Int. Cl.
*F16C 29/00* (2006.01)
(52) U.S. Cl.
CPC ................. *F16C 29/007* (2013.01)
(58) Field of Classification Search
CPC ....... F16C 29/004; F16C 29/007; F16C 29/04
See application file for complete search history.

(56) References Cited

U.S. PATENT DOCUMENTS

| 4,714,354 A | 12/1987 | Satomi |
| 5,281,029 A | 1/1994 | Morita |
| (Continued) | | |

FOREIGN PATENT DOCUMENTS

| CN | 104350295 A | 2/2015 |
| CN | 111692205 A | 9/2020 |
| (Continued) | | |

OTHER PUBLICATIONS

European Patent Office, International Search Report for PCT App. No. PCT/EP2022/059521, Jul. 26, 2022, pp. 1-4.
(Continued)

*Primary Examiner* — James Pilkington
(74) *Attorney, Agent, or Firm* — Cahn & Samuels, LLP

(57) ABSTRACT

A bearing (1) for mounting on a cylindrical guide section (61), extending in a longitudinal direction, of a rail (6), is guided displaceably in a longitudinal direction rollers and sliding elements. The bearing (1) includes a housing which has a passageway that runs through the housing and in which a receiving channel for receiving the guide section (61) of the rail (6) is formed. The bearing (1) includes two rollers (8) which are spaced apart from each other in the longitudinal direction, are in each case mounted rotatably in the housing and, with their running surfaces, in each case delimit the receiving channel in a transverse direction. Between the rollers (8), the housing has an installation channel, which runs through the housing along an installation axis (Y) perpendicularly to the longitudinal direction, for receiving an installation bolt in a manner rotatable about the installation axis (Y). A plurality of sliding elements (7) are arranged in the passageway and in each case, by means of one of their sides, delimit the receiving channel perpendicularly to the longitudinal direction.

18 Claims, 3 Drawing Sheets

(56) References Cited

U.S. PATENT DOCUMENTS

| | | | | |
|---|---|---|---|---|
| 6,113,275 | A * | 9/2000 | Blase | F16C 33/20 |
| | | | | 384/42 |
| 9,139,141 | B2 * | 9/2015 | Calvin | F16C 29/007 |
| 2006/0083447 | A1 * | 4/2006 | Moshammer | F16C 29/02 |
| | | | | 384/26 |
| 2015/0176643 | A1 | 6/2015 | Hoshide et al. | |

FOREIGN PATENT DOCUMENTS

| | | |
|---|---|---|
| DE | 3224282 A1 | 12/1983 |
| DE | 4324059 A1 | 1/1995 |
| DE | 202009004685 U1 | 1/2011 |
| DE | 10 2014 014 789 A1 | 4/2016 |
| JP | H02309010 A | 12/1990 |
| JP | 105-149333 A | 6/1993 |
| JP | H05-149334 A | 6/1993 |
| KR | 10-2024135 B1 | 9/2019 |

OTHER PUBLICATIONS

European Patent Office, Written Opinion for PCT App. No. PCT/EP2022/059521, Jul. 26, 2022, pp. 1-7.

European Patent Office, Preliminary Report on Patentability for PCT App. No. PCT/EP2022/059521, Apr. 5, 2022, pp. 1-20.

European Patent Office, Espacenet, English abstract for JPH05149334A, printed on Oct. 3, 2023.

European Patent Office, Espacenet, English abstract for DE3224282A1, printed on Oct. 3, 2023.

European Patent Office, Espacenet, English abstract for CN111692205A, printed on Oct. 3, 2023.

European Patent Office, Espacenet, English abstract for JPH05149333A, printed on Oct. 3, 2023.

European Patent Office, Espacenet, English abstract for KR102024135B1, printed on Oct. 3, 2023.

The International Bureau of WIPO, English translation of Preliminary Report on Patentability for PCT App. No. PCT/EP2022/059521, Apr. 5, 2022, pp. 1-6.

China National Intellectual Property Administration, Office Action for CN202280035053.X, Mar. 26, 2025, pp. 1-2.

European Patent Office, English abstract for CN104350295A, retrieved Apr. 16, 2025.

European Patent Office, English abstract for TW201102532A (claimed priority to DE202009004685U1), retrieved Apr. 16, 2025.

European Patent Office, English abstract for DE4324059A1, retrieved Apr. 16, 2025.

Japan Patent Office, Office Action for JP2023-562631, Apr. 30, 2025, pp. 1-6.

European Patent Office, English abstract for JPH02309010A, retrieved May 22, 2025, p. 1.

* cited by examiner

Fig. 1a
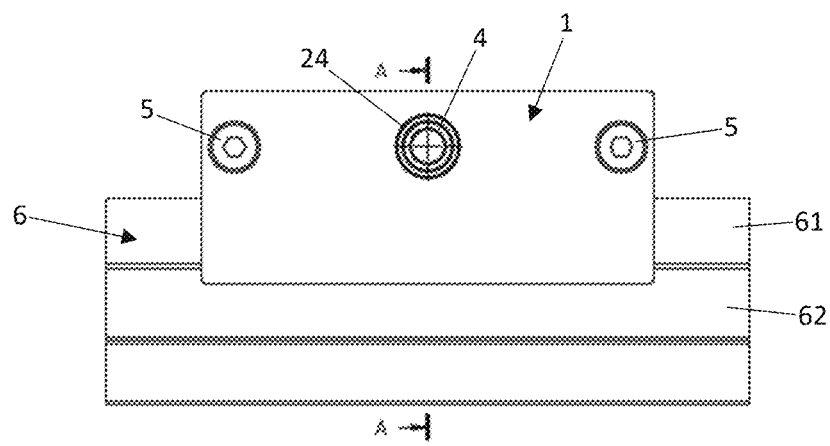
Fig. 1b
Fig. 1c
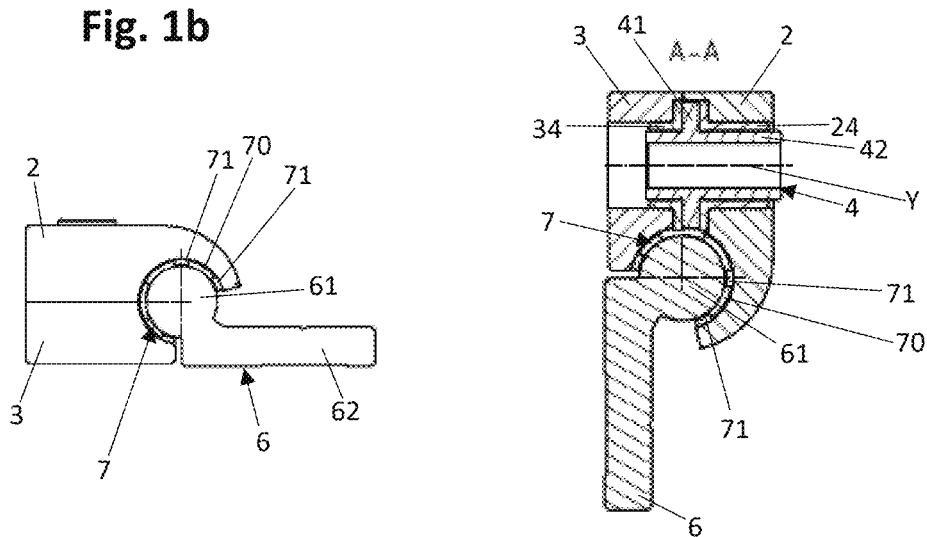
Fig. 2a
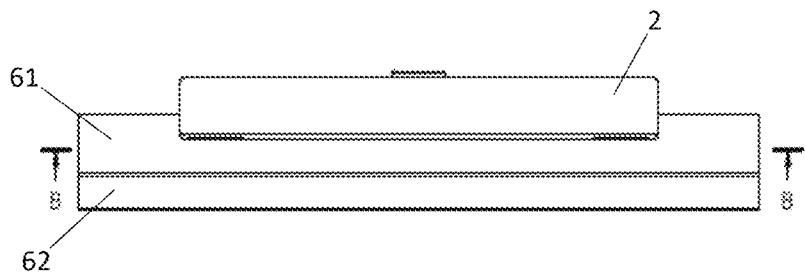

STATICALLY OPTIMIZED HYBRID ROLLER BEARING

I. FIELD OF THE INVENTION

The invention relates to a bearing for longitudinally movement along a cylindrical guide portion (61) of a rail (6) extending with a cylinder axis in the longitudinal direction and to a bearing assembly with such a bearing and to use of such a bearing.

II. BACKGROUND OF THE INVENTION

Bearings of a generic type are used for longitudinally sliding mounting, in particular lubricant-free mounting, of working devices on a rail. Bearings of this type are based on a hybrid principle in which the bearing arrangement is based on both rollers and sliding elements. Such a bearing has a housing in which is provided a receiving channel which runs through the housing in the longitudinal direction. Furthermore, such a bearing has both at least one roller and at least one sliding element. The roller is rotatably mounted in the housing with respect to a roller axle extending perpendicular to the longitudinal direction. When the bearing is used as intended, a guide portion of a rail configured in the manner of a cylinder is received in the receiving channel and bears against a running surface of the roller, and the at least one sliding element encloses the guide portion over an angular range of more than 200°, in particular more than 220°. When used as intended, a working device is arranged on the bearing in such a way that the roller transmits the main load to the guide portion and rolls along the guide portion during displacement of the bearing relative to the guide portion in the longitudinal direction, whereas the sliding element is provided an offset in the longitudinal direction relative to the roller so that, in the event of transverse loading, i.e., loading perpendicular to the main load direction and perpendicular to the longitudinal direction, on the bearing relative to the guide portion of the rail, the sliding element slides along the guide portion pressed there against by said transverse loading during longitudinal displacement of the bearing relative to the guide portion. Bearings of this type are particularly suitable for working devices which are to be displaced by hand in the longitudinal direction, for example in camera technology, machine tool doors or panels, since on the one hand such bearings, thanks to the hybrid technology used therein, are able to carry large loads along a rail with very little friction, and on the other hand any transverse forces that occur when the working device and thus the bearing are displaced, in particular manually, are absorbed by the sliding element used and thus the working device attached to the bearing can be displaced along the rail without generating any significant noise and without any significant friction.

In bearings of this type, the roller and sliding element used are arranged and matched to one another in such a way in the housing passageway that, when the bearing is loaded along the main load direction, i.e., when loading is perpendicular to the roller axle, the sliding element bears against the guide portion with as small a contact area as possible. However, such a bearing is subject to a limitation when loaded in the main load direction, on the one hand by the material of the housing and the roller and, if a separate roller axle is provided, which is attached to the housing and on which the roller is rotatably mounted, by the material of the roller axle. If loading in the main load direction is too great, considerable wear phenomena and, in particular, also elevated friction will arise. Accordingly, such bearings can be used as intended only up to a static load-carrying capacity specified by the manufacturer, based on a load carried in the main load direction, and a dynamic load-carrying capacity based on a load carried in the main load direction, the dynamic load-carrying capacity being specified as a function of the intended total running distance. If working devices are mounted to slide in the longitudinal direction by way of such bearings loaded to such a degree that the static load-carrying capacity is exceeded, it is necessary to provide a plurality of bearings which are arranged in succession along the longitudinal direction and are thus connected in parallel with respect to the main load direction and thus jointly carry the load applied by the working device. However, this has turned out to be problematic since such a large number of bearings requires complicated installation in order to avoid unintentionally high friction between the guide portion of the rail and the bearings and/or excessive wear of the bearings, especially their rollers. This is because the bearings must be oriented with the longitudinal axes of their passageways aligned precisely with one another, since each bearing unambiguously fixes the position of the guide portion perpendicular to the longitudinal direction, such that any deviation in the alignment of the longitudinal axes of the various bearings from one another leads to overdefined positioning of the guide portion by the bearing assembly produced by the bearings and is accompanied by corresponding frictional losses or loading.

A bearing is known from U.S. Pat. No. 4,714,354 A. Further prior art is known from the publications JP H05 149334 A, US 2015/176643 A1, U.S. Pat. No. 5,281,029 A and DE 32 24 282 A1.

III. SUMMARY OF THE INVENTION

The object of the present invention is to provide a bearing and/or a bearing assembly and/or use of a bearing which at least partly eliminates at least one disadvantage of bearings of said generic type.

As one way of achieving the object underlying the present invention, the invention proposes a bearing having a housing with a passageway running through the housing along the longitudinal axis running in a longitudinal direction and two rollers spaced apart in the longitudinal direction. The bearing according to the invention is suitable for mounting, guided displaceably in the longitudinal direction, a cylindrical guide portion of a rail extending with its cylinder axis in the longitudinal direction. The bearing is roller- and sliding element-based, such that the bearing is mounted on both at least one roller and at least one sliding element. The bearing comprises a housing which has a passageway running through the housing along a longitudinal axis extending in the longitudinal direction. A receiving channel is formed in the passageway for receiving the guide portion of the rail. When the bearing is used as intended, the guide portion is arranged in the receiving channel with its cylinder axis aligned along the longitudinal axis of the passageway. The receiving channel is at least partly closed, preferably uninterruptedly closed, perpendicular to the longitudinal direction, in particular over an angular range of at least 200°, in particular at least 220°, in particular at least 240°, in particular at least 260°. This enclosure is preferably present over at least 50%, in particular at least 80%, of the length over which the passageway extends along the longitudinal axis thereof. The receiving channel lies completely within the passageway. The receiving channel may, for example, be bounded in places in its extent perpendicular to the longitudinal direction by the passageway itself, and in some embodiments may be bounded perpendicular to the longitudinal direction by elements of the bearing arranged in the passageway, i.e., at least extending into the passageway, for example by sliding elements and rollers arranged in the passageway. Due to the passageway running in the longitudinal direction through the housing, the cylindrical guide portion of the rail may be arranged in the receiving channel arranged in the passageway and, in the case of such an arrangement of such a guide portion, whose extent in the longitudinal direction amounts to at least five times, in particular at least ten times, the extent of the housing in the longitudinal direction, the bearing can be displaced in the longitudinal direction along the guide portion while the latter is arranged in the receiving channel.

According to the proposed solution, the bearing has two rollers spaced apart in the longitudinal direction, each of which is rotatably mounted in the housing about a roller axle running perpendicular to the longitudinal direction and each of which bounds the receiving channel with its running surfaces in a transverse direction running perpendicular to its roller axle. Each roller is thus mounted in the housing in such a way that it can be rotated about a roller axle associated therewith. This may be achieved, for example, using a bearing arrangement applied to the circumference of the respective roller and thus a bearing arrangement against the running surface thereof outside the receiving channel. Preferably, however, this is achieved using a roller axle which is firmly connected to the housing or integrated in the housing and runs through the center of the roller and on which the roller is rotatably mounted such that its running surface circumferentially surrounds the roller axle. Each roller extends with its running surface, i.e., with its radial end, at least in sections into the passageway such that it bounds the receiving channel provided in the passageway perpendicular to the longitudinal direction. When the bearing is used as intended, the cylindrical guide portion lies in the receiving channel and thereby against the running surfaces of the rollers. Each roller accordingly bounds the receiving channel in a transverse direction running perpendicular to its respective roller axle and to the longitudinal direction. A transverse direction is thus unambiguously assigned to each roller. Preferably, the same transverse direction is assigned to all the rollers such that the roller axles run parallel. In some embodiments, the bearing may also include more than two rollers, for example a first pair of rollers at a first position in the longitudinal direction and a second pair of rollers at a second position in the longitudinal direction, wherein the roller axles of the rollers of each pair are tilted relative to one another by an angle about the longitudinal direction such that, when used as intended, they bear against two circumferential portions of the guide portion that are offset relative to one another by a corresponding angle about the longitudinal axis. In such an embodiment, preferably the roller axle of each one of the rollers of each pair is oriented parallel to the roller axle of a respective one of the rollers of the respectively other pair of rollers. The roller axles of the rollers of a pair preferably have an angle about the longitudinal axis of less than 120°, in particular less than 90°. Preferably, there are only two longitudinal positions in the bearing at which a respective roller or pair of rollers is provided, these longitudinal positions being spaced apart in the longitudinal direction as explained. The housing further includes, in the longitudinal direction between the rollers or between said positions of the rollers, a mounting channel running through the housing perpendicular to the longitudinal direction along a mounting axis. The mounting axis thus runs in a transverse direction running perpendicular to the longitudinal direction. The mounting channel is suitable for receiving a preferably cylindrical mounting peg in such a way that the mounting peg is arranged in the mounting channel, extends through the housing along the mounting axis and is received rotatably about the mounting axis, but is fixed in its longitudinal position by the mounting channel. It goes without saying that, instead of a mounting peg, a mounting bushing may also be arranged in the mounting channel, or a mounting bushing may be arranged in the mounting channel in which in turn a mounting peg is arranged. In this case, the mounting bushing is correspondingly received in the mounting channel, extends through the housing along the mounting axis, and is mounted rotatably about the mounting axis, but is fixed in its position in the longitudinal direction by the mounting channel. A plurality of sliding elements spaced apart in the longitudinal direction and offset relative to the rollers in the longitudinal direction are additionally arranged in the passageway, said sliding elements each bounding the receiving channel perpendicular to the longitudinal direction with one of their sides. Through the provision of a plurality of sliding elements which are arranged offset in the longitudinal direction relative to the rollers and bound the receiving channel, the guide portion may come into contact with at least one of the sliding elements when the bearing is used as intended, if the guide portion undergoes a force perpendicular to the longitudinal direction relative to the bearing which has a force component perpendicular to the transverse directions of the rollers, such that even in such a case low-noise and low-friction, longitudinally displaceable mounting of the guide portion in the receiving channel is ensured, since even then the housing bears against the guide portion only via at least one roller and at least one sliding element, which is generally advantageous according to the invention.

The bearing according to the invention has a number of advantages. The combination of two rollers spaced apart in the longitudinal direction and of a plurality of sliding elements spaced apart in the longitudinal direction and offset relative to the rollers means that even in the event of exposure to forces with a component perpendicular to the longitudinal direction and perpendicular to the transverse direction, the guide portion can always be guaranteed to bear against the bearing with as little friction as possible and excessive wear can be prevented, whereby a long service life is achievable for the bearing. Through the provision of two rollers spaced apart in the longitudinal direction rollers, the two rollers can absorb a load in the main load direction of a working device attached to the bearing. The main load direction is preferably parallel to the transverse directions of the rollers spaced apart in the longitudinal direction or parallel to the bisector of the transverse directions of the rollers of a respective pair of rollers, provided that one pair of rollers is in each case provided at each longitudinal position. In this way, the bearing is also suitable for use with large loads, in particular with a static load-carrying capacity of more than 400 N, in particular more than 700 N, and with a dynamic load-carrying capacity for a total running distance of 10 km of more than 400 N, in particular more than 700 N, the load-carrying capacity being geared towards a load along the main load direction. Through the further provision in the longitudinal direction between the rollers of the mounting channel, in which a mounting peg and/or a mounting bushing may be rotatably received, the bearing may be attached to a structural member via such a mounting peg or such a mounting bushing and, when a force with a force component perpendicular to the main load direction and perpendicular to the longitudinal direction acts between the guide portion of the rail and the bearing, may be rotated about the peg or bushing, while the guide portion bears against at least one roller and at least one sliding element. This prevents the guide portion from jamming in the bearing. This is particularly advantageous when using two bearings that are spaced apart in the longitudinal direction, since even when the longitudinal axes of their passageways are not fully aligned with one another, these bearings may rotate relative to one another by rotating about their respective mounting peg or their respective mounting bushing, such that jamming of the guide portion relative to the bearings is prevented even in the case of such use. The invention thus also relates in particular to the use of two bearings spaced apart in the longitudinal direction as a bearing assembly via which a force in the main load direction of preferably at least 800 N, in particular at least 1000 N, in particular at least 1500 N can be carried slidingly on a rail in a longitudinal direction, as intended. It is generally preferred for the running surfaces of the two rollers spaced apart in the longitudinal direction in each case to abut the same straight line that runs parallel to the longitudinal axis of the passageway and bounds the receiving channel in a direction perpendicular to the longitudinal direction. The sliding elements preferably extend with their cross-section perpendicular to the longitudinal direction in the manner of a segment of an arc of a circle, through the center of which runs the longitudinal axis of the passageway. The segment of an arc of a circle is preferably closed continuously over an angular range of at least 200°, in particular at least 220°, in particular at least 240°, in particular at least 260° about the longitudinal axis.

In general, the bearing preferably has a mounting bushing rotatably mounted in the mounting channel. The mounting bushing is preferably configured in the manner of a cylinder and extends with its cylinder axis along the mounting axis. The mounting bushing is preferably arranged in such a way in the mounting channel that it has clearance in the longitudinal direction of less than 0.5 mm, in particular less than 0.2 mm. The mounting bushing preferably projects beyond the housing along the mounting axis on at least one side. This allows the mounting bushing to be fixed at its ends in position on a structural member without consequently restricting the ability of the housing to rotate relative to the mounting bushing.

The housing preferably has first and second housing parts arranged next to one another along the mounting axis and fixed detachably to one another. The two housing parts together form the mounting channel and/or together form the passageway. The provision of two housing parts detachably connected to one another makes the manufacture and mounting of a bearing according to the invention particularly simple.

Particularly, preferably, the mounting channel is spaced equidistantly in the longitudinal direction from both rollers or both longitudinal positions of the rollers or pairs of rollers arranged offset from one another in the longitudinal direction. This has the particular advantage that, in the event of any force loading perpendicular to the longitudinal direction and perpendicular to the transverse direction of the rollers, the bearing can be uniformly rotated by a rotation about a mounting bushing arranged in the mounting channel or a mounting peg arranged in the mounting channel. The mounting axis and roller axles preferably all run perpendicular to the longitudinal axis, with the mounting axis being spaced equidistantly in each case from both roller axles in the longitudinal direction. Particularly, preferably, the mounting channel is arranged on the same side of the receiving channel as the roller axles. It goes without saying that the roller axles and the mounting channel are arranged outside the receiving channel with respect to a direction perpendicular to the longitudinal direction, preferably on the same side of the receiving channel with respect to this direction. Preferably, at least one of the sliding elements is arranged in each longitudinal end portion of the passageway. The passageway has two longitudinal end portions opposing in the longitudinal direction. Each longitudinal end portion extends from the absolute longitudinal end of the passageway associated therewith over a maximum of 30%, in particular a maximum of 20%, in particular a maximum of 10% of the extent of the passageway in the longitudinal direction. Preferably, respectively one of the sliding elements is arranged solely within the respective longitudinal end section. The mounting channel or mounting axis is preferably spaced equidistantly along the longitudinal direction from the two sliding elements arranged in the two longitudinal end portions of the passageway. The respective sliding element arranged in the respective longitudinal end portion is preferably arranged closer to the absolute longitudinal end of the housing associated therewith than the roller closest thereto in the longitudinal direction. The sliding elements arranged in the longitudinal end portions are preferably each spaced apart by the same distance in the longitudinal direction from the roller closest to them in the longitudinal direction.

Particularly, preferably, the running surfaces of the rollers have a concave contour facing the receiving channel. Due to the concave contour, the rollers can particularly advantageously bear against the guide portion and in particular contribute to further guidance of the guide portion. Particularly preferably, the contours have, perpendicular to the longitudinal direction, a cross-section configured in the manner of a segment of a sphere. This is particularly advantageous when the guide portion is embodied in the manner of a cylinder with a round or oval cross-section.

In one embodiment, the mounting bushing has on its outer side a radial projection, in particular in the form of a flange. The projection extends radially and thus perpendicular to the mounting axis. The projection is arranged in a radial extension of the mounting channel, which is bounded along the mounting axis on both sides inside the housing. The mounting channel is preferably configured in the manner of a cylinder, which has the radial extension. Due to the radial extension being bounded on both sides, the radial extension forms stops for the projection, which fix a position of the projection along the mounting axis. The arrangement of the projection in the radial extension of the mounting channel thus fixes the position of the mounting bushing relative to the housing along the mounting axis. Particularly, preferably, the radial extension of the mounting channel is formed in each case by transverse ends of the two housing parts facing one another along the mounting axis. The radial extension is thus formed jointly by the two housing parts. The term "transverse ends" designates the ends of the housing parts with which they face one another along the mounting axis and, in particular, abut one another. Using the two housing parts to form the radial extension is particularly favorable with regard to ease of manufacture of the bearing. Particularly, preferably, an in particular a hollow cylindrical first sliding member is provided in the mounting channel between the housing and the mounting bushing. The sliding member ensures low-friction rotatability of the mounting bushing relative to the housing. The first sliding member preferably includes a first sliding member projection with which it is arranged in a first portion of the radial extension of the mounting channel to fix a position of the first sliding member relative to the housing along the mounting axis. In the mounting channel, a second sliding member is preferably provided offset from the first sliding member along the mounting axis, the second sliding member preferably having a second sliding member projection with which it is arranged in a second portion of the radial extension of the mounting channel to fix a position of the second sliding member relative to the housing along the mounting axis. The projection of the mounting bushing preferably lies along the mounting axis with a first side against the first sliding member projection and with a second side, remote from the first, against the second sliding member projection. The radial extension is preferably a radial extension continuous along the mounting axis, the two sliding member projections and the projection of the mounting bushing being arranged in the radial extension. The mounting bushing thus preferably bears against the housing solely via the at least one sliding member and thus not directly. Particularly, preferably, the first sliding member is arranged, in particular solely, in a first portion of the mounting channel formed by the first housing part. Particularly, preferably, the second sliding member is arranged, in particular solely, in a second portion of the mounting channel formed by the second housing part. The mounting channel preferably consists of the two portions.

It is generally preferred for the sliding elements to enclose the longitudinal axis of the passageway with an enclosure angle of at least 220°, in particular at least 240°, in particular at least 260°. It is generally preferred for the passageway to completely enclose the longitudinal axis perpendicular to the longitudinal direction over an angular range of at least 220°, in particular at least 240°, in particular at least 260°. Particularly, preferably, the passageway has a longitudinally continuous opening on a side facing perpendicular to the longitudinal direction. The sliding elements preferably have a longitudinally continuous opening aligned with the opening of the passageway. The opening provided in the passageway and, in particular, the sliding members serves to allow a web, via which the cylindrical guide portion of the rail is connected to a rail body of the rail, to slide through the opening while the bearing is being displaced slidingly along the longitudinal direction on the guide portion of the rail.

It is generally preferred for the sliding elements to have grooves running in the longitudinal direction. This can prevent an increase in friction due to soiling, and the contact area over which the sliding elements bear against the guide portion can be kept advantageously small thereby. It is generally preferred for the roller axles to run parallel to the mounting axis. It is generally preferred for the sliding elements to be made of a tribological polymer. The sliding members are preferably made of a tribological polymer. Such a tribological polymer is a polymer optimized with respect to wear reduction and friction reduction. Such a tribological polymer conventionally has a base polymer, for example the thermoplastics polyethene, polypropylene, polyacetal, polycarbonate, polyamide, polyvinyl chloride, polytetrafluoroethene and, in the case of thermosets, phenolic resins. To this base polymer are added finely divided solid lubricants, for example molybdenum disulfide or graphite, and/or fillers, for example plastics material or textile fibers or particles. The housing is preferably made of a metal or a metal alloy, in particular by die-casting. The housing and thus the passageway preferably extends in the longitudinal direction by at least 6 cm, in particular between 6 cm and 15 cm. The rollers preferably have a diameter of 10 mm to 30 mm, in particular 15 mm to 25 mm. The rollers are preferably made of a plastics material. The roller axles are preferably produced as a separate pin element fixed in the housing, particularly, preferably made of metal or a metal alloy. The housing is generally preferably made of aluminum.

The invention further relates to a bearing assembly with a bearing according to the invention and with a rail which has a guide portion configured in the manner of a cylinder. In the bearing assembly according to the invention, the guide portion is arranged so as to be displaceable in the passageway of the bearing in the longitudinal direction, in particular arranged in the receiving channel of the bearing located in the passageway, and bears against both rollers perpendicular to the longitudinal direction. The guide portion is preferably spaced apart from the sliding elements perpendicular to the longitudinal direction by less than 1 mm, in particular less than 0.5 mm, in particular less than 0.2 mm. Particularly preferably, the rail has a rail body, and a web connected to the rail body which is connected to the guide portion and thus connects the guide portion to the rail body. The web preferably runs uninterruptedly in the longitudinal direction along the lengthwise extent of the rail. The guide portion is preferably configured in the manner of a cylinder with a circular or oval cross-section, to one side of which is attached the web which connects the guide portion to the rail body. The rail comprising a rail body, a web and a guide portion is preferably manufactured in one piece, in particular made of aluminum, in particular by extrusion. Particularly, preferably, the bearing assembly comprises a further bearing according to the invention, such that it comprises two bearings according to the invention, in particular precisely two bearings according to the invention. The bearings are arranged next to one another in the longitudinal direction and are preferably spaced apart in the longitudinal direction. The guide portion of the rail is arranged in the passageways, in particular in the receiving channels, of the two bearings, and the bearings are in each case fastened to a structural member by way of a mounting peg arranged in their respective mounting channel and/or a mounting bushing arranged in their respective mounting channel. The structural member may, for example, be a machine part, for example the supporting frame of a machine, or a part of a building, for example a wall.

The invention further relates to the use of a bearing according to the invention, wherein a mounting peg and/or a mounting bushing is guided by the channel and is fixed in position relative to the housing of the bearing, in particular with respect to the longitudinal direction and/or the transverse direction running parallel to the mounting axis and/or a direction running perpendicular to the mounting axis and to the longitudinal axis, and at the same time is fixed rotatably about the mounting axis. This fixing in position thus prevents translation relative to the housing, but not rotation. A mounting bushing is preferably arranged in the mounting channel, into which the bushing is inserted a mounting peg which is fastened to the mounting bushing at both ends thereof, such that the mounting peg and the mounting bushing are connected to one another in a positionally fixed and non-rotatable manner, while the housing is mounted to be rotatable about the mounting bushing. In the use according to the invention, a guide portion of a rail formed in the manner of a cylinder is inserted along the longitudinal direction into the receiving channel in contact with the rollers, rotating the rollers about their roller axles. Particularly, preferably, the bearing is then displaced relative to the rail along the longitudinal direction, wherein a force is applied between the bearing and the rail by which the bearing is rotated about the mounting peg and/or about the mounting bushing and the guide portion is pressed against at least one of the sliding elements and, pressed thereagainst, slides along in the longitudinal direction, while at the same time it bears against at least one of the rollers and this one roller rotates about its roller axle. The force preferably has a force component in the longitudinal direction and a force component perpendicular to the transverse direction of this roller.

IV. BRIEF DESCRIPTION OF THE DRAWINGS

The invention is explained in more detail below on the basis of an exemplary embodiment with reference to four figures.

In the figures:

FIG. 1 shows different schematic diagrams of different views of an embodiment of a bearing assembly according to the invention;

V. DETAILED DESCRIPTION OF THE INVENTION

Figure 2B:
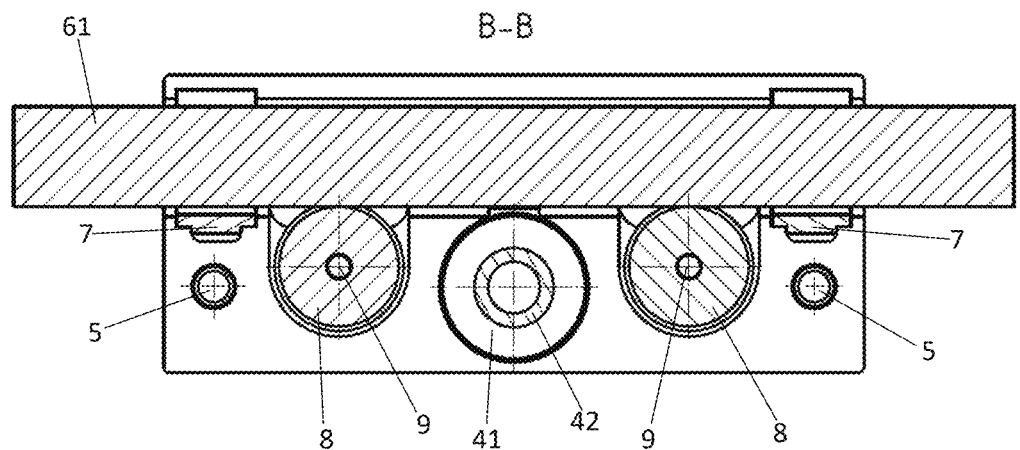
FIG. 2 shows different schematic diagrams of different views of components of the bearing assembly according to the invention as shown in FIG. 1.

FIG. 1, comprising FIGS. 1a, 1b and 1c, shows different views of an embodiment of a bearing assembly according to the invention in different schematic diagrams. The bearing assembly comprises a bearing 1 and a rail 6. The bearing 1 comprises a first housing part 2 and a second housing part 3. First and second housing parts 2, 3 together form the housing of the bearing 1. The housing has a passageway running through the housing along a longitudinal axis X running in the longitudinal direction. A guide portion 61 of the rail 6, configured in the manner of a cylinder, is arranged in the passageway and is connected to a rail body 62 of the rail 6 via a web. The passageway with the guide portion 61 received therein is apparent from the plan view along the longitudinal direction according to FIG. 1b as well as from the sectional view perpendicular to the longitudinal direction according to FIG. 1c. The passageway uninterruptedly encloses the longitudinal axis X perpendicular to the longitudinal direction over an angular range of approx. 260°. On a side facing perpendicular to the longitudinal direction, the passageway has an opening which is continuous in the longitudinal direction and through which extends the web via which the guide portion 61 is connected to the rail body 62. This opening corresponds to the angular range over which the passageway does not enclose the longitudinal axis X. The housing parts 2, 3 additionally form a mounting channel extending in the manner of a cylinder along a mounting axis Y. Arranged in this mounting channel is a mounting bushing 4, which, being arranged in the mounting channel, is fixed in position relative to the housing parts 2, 3 with respect to the longitudinal direction, but is rotatable relative to the housing parts 2, 3 about the mounting axis Y. The mounting bushing 4 has a hollow-cylindrical jacket part 42, on the radial outer side of which is formed a circumferentially extending projection 41 configured as a flange, this being generally advantageous according to the invention. The mounting channel has a radial extension bounded on both sides along the mounting axis Y and in which is arranged the projection 41 of the mounting bushing 4, such that the mounting bushing 4 is fixed in its position along the mounting axis Y relative to the housing parts 2, 3. Furthermore, a first sliding member 24 and a second sliding member 34 are provided, each of which has a sliding member projection with which it engages in the radial extension of the mounting channel, such that the sliding members 24, 34 are also held in a fixed position relative to the housing parts 2, 3 with respect to the mounting axis Y. The radial extension of the mounting channel is a radial extension continuous along the mounting axis Y, in which are arranged both the projection 41 of the mounting bushing 4 and the sliding member projections of the sliding members 24, 34. The two housing parts 2, 3 in each case form a portion of the mounting channel and, at their transverse ends facing one another along the mounting axis Y, in each case form a portion of the radial extension of the mounting channel. The housing parts 2, 3 are arranged next to one another along the mounting axis Y and are detachably fixed to one another with their transverse ends facing one another by bolts 5. This structure of the bearing 1 makes it particularly easy to assemble, and in particular to maintain, the bearing 1, for example, to replace sliding members 24, 34 or to replace a sliding element 7 located in the passageway and bearing against both the guide portion 61 and the passageway. The sliding element 7 has grooves 70 running along the longitudinal axis X as well as sections 71 adjacent to the grooves 70, where the sliding element 7 bears against the guide portion 61 with these sections 71.

Figure 3:
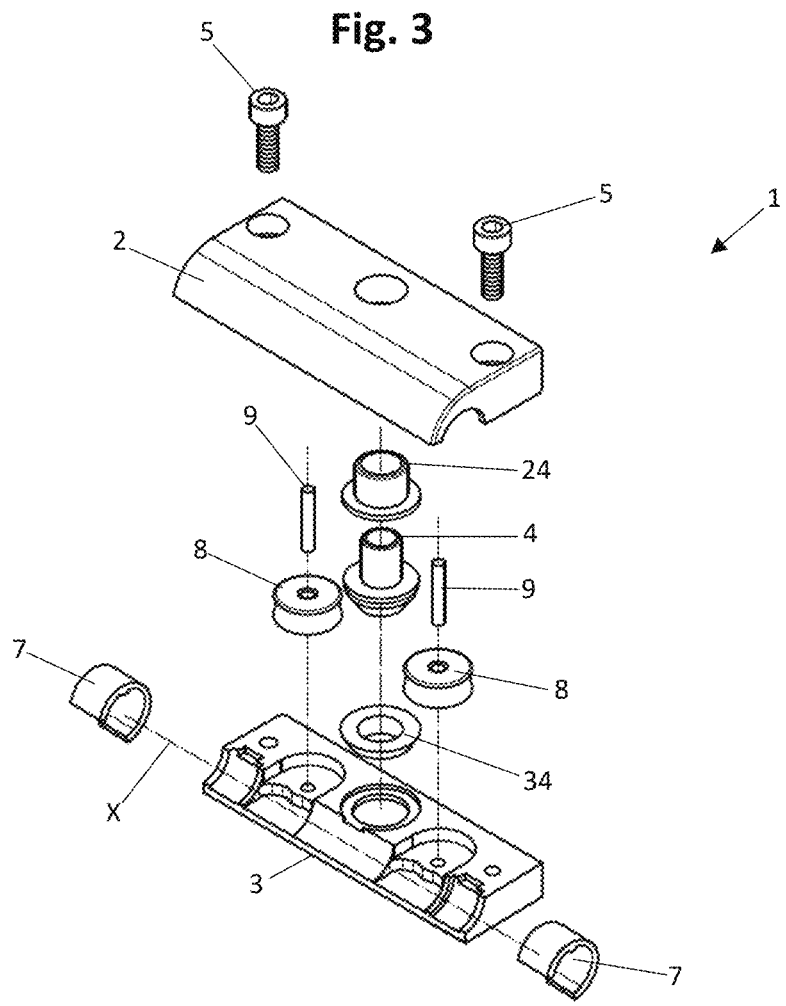
FIG. 3 is a schematic exploded view of the bearing of the bearing assembly according to the invention as shown in FIG. 1.

FIG. 2, comprising FIGS. 2a and 2b, shows different views of components of the bearing assembly according to FIG. 1 schematically in different diagrams. FIG. 2a shows the bearing assembly according to FIG. 1 without the second housing part 3. FIG. 2b shows a view of a section B-B perpendicular to the mounting axis Y of the module shown in FIG. 2a. Furthermore, FIG. 3 is a schematic representation of the bearing 1 of the bearing assembly according to FIG. 1 in an exploded view. The configuration and mode of operation of the bearing 1 is apparent in particular from FIGS. 2a, 2b and 3 viewed together. The bearing 1 has two rollers 8, which are each mounted in the housing rotatably about a roller axle 9. The roller axles 9 of both rollers 8 in each case run parallel to the mounting axis Y and are in each case received in blind holes in the two housing parts 2, 3. In the embodiment described, the roller axles 9 are configured as separate pin elements fixed in the housing. The two roller axles 9 and thus also the two rollers 8 are spaced from the mounting channel by one and the same distance along the longitudinal axis X and lie, with respect to the longitudinal direction, on two different sides of the mounting channel and thus also of the mounting bushing 4. In each longitudinal end portion of the passageway, there is provided a sliding element 7 which encloses the longitudinal axis X with an enclosing angle of approximately 260°. In the intended use shown in FIG. 2b, the cylindrical guide portion 61 of the rail 6 bears both on the running surfaces of the two rollers 8 and on the sliding elements 7. This is generally advantageous according to the invention. The sliding elements 7 and the rollers 8 bound the receiving channel formed in the passageway, in which is received the guide portion 61 in a transverse direction that is perpendicular to the longitudinal axis X and to the mounting axis Y. This transverse direction corresponds to the main load direction of the bearing 1, the transverse direction being perpendicular to the roller axles 9 and the mounting axis Y, which run parallel to one another and perpendicular to the longitudinal axis X, this being generally advantageous according to the invention.

Looking at the figures together further reveals that the mounting bushing 4 bears solely via sliding members 24, 34 and thus not directly on the housing parts 2, 3. This ensures that the mounting bushing 4 can be rotated relative to the housing parts 2, 3 with as little friction as possible. Provision of the sliding elements 7 and the rollers 8 further ensures particularly loadable, low-friction mounting, displaceable along the longitudinal axis X, of the guide portion 61 of the rail in the bearing 1. The sliding members 24, 34 and the sliding elements 7 are here each made of tribological polymer. FIGS. 2b and 3 further show that the two housing parts 2, 3 in each case jointly form a roller cavity for each of the rollers 8, in which is received the respective roller 8. Each of the housing parts 2, 3 forms a boundary of the respective roller cavity along the mounting axis Y, such that the roller 8 is fixed in the respective roller cavity in its position relative to the housing with respect to the mounting axis Y. Particularly preferably, and as implemented in the present exemplary embodiment, the rollers 8 are received with more than 50%, preferably more than 70% of their running surfaces in the respective roller cavity and extend with their running surfaces out of the respective roller cavity into the passageway of the housing. The provision of corresponding roller cavities is generally advantageous according to the invention.

Figure 4:
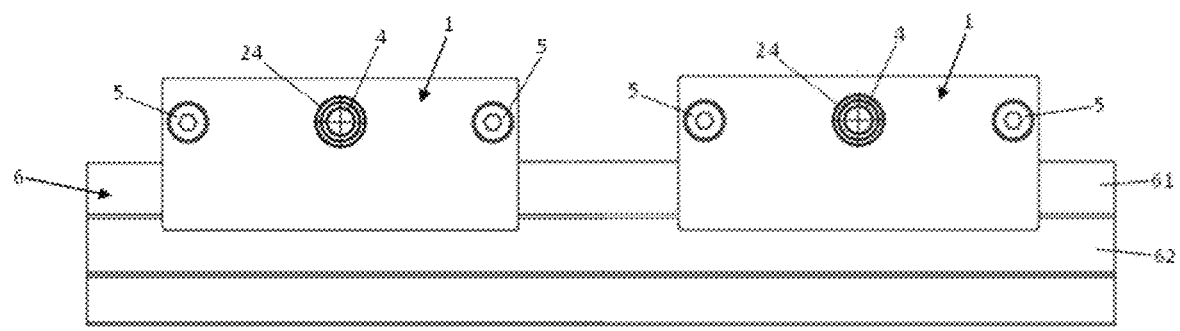
FIG. 4 is a schematic view of a bearing assembly according to the invention having two bearings.

FIG. 4 is a schematic view of a bearing assembly having two bearings 1, each bearing 1 being designed as explained with regard to FIGS. 1 to 3 above, where the bearings are arranged next to one another along the longitudinal axis X and where the guide portion 61 is arranged in the passageways of the bearings 1. The bearings 1 can each be fastened to a structural member by way of a mounting bushing 4 arranged in their respective mounting channel.

LIST OF REFERENCE SIGNS

1 Bearing
2 First housing part
3 Second housing part
4 Mounting bushing
5 Bolt
6 Rail
7 Sliding element
8 Roller
9 Roller axle
24 First sliding member
34 Second sliding member
41 Projection
61 Guide portion
62 Rail body
70 Groove of sliding element
71 Section of sliding element
X Longitudinal axis
Y Mounting axis

The invention claimed is:

1. A bearing for longitudinal movement along a cylindrical guide portion of a rail extending with a cylinder axis in a longitudinal direction, the bearing comprising:
   a housing having a passageway running through the housing along a longitudinal axis running in the longitudinal direction, the passageway forming a receiving channel for receiving the guide portion of the rail; and
   two rollers spaced apart in the longitudinal direction, each roller being rotatable in the housing about a roller axle running perpendicular to the longitudinal direction and each roller bounding the receiving channel with a running surface in a transverse direction extending perpendicular to the roller axle, and
   wherein the housing has, in the longitudinal direction between the rollers, a mounting channel running through the housing perpendicular to the longitudinal direction along a mounting axis for receiving a mounting peg which is rotatable about the mounting axis, and
   wherein a plurality of sliding elements is arranged in the passageway spaced apart from each other in the longitudinal direction, the sliding elements being longitudinally spaced apart relative to the rollers, said sliding elements each bounding the receiving channel perpendicular to the longitudinal direction.

2. The bearing according to claim 1, wherein a mounting bushing is rotatably mounted in the mounting channel and projects along the mounting axis beyond the housing on at least one side.

3. The bearing according to claim 2, further comprising a hollow cylindrical first sliding member in the mounting channel between the housing and the mounting bushing; and
   a second sliding member in the mounting channel offset from the first sliding member along the mounting axis.

4. The bearing according claim 1, wherein the housing has first and second housing parts arranged next to one another along the mounting axis and fixed detachably to one another.

5. The bearing according to claim 2, wherein the mounting bushing has on an outer side a radial projection, which is arranged in a radial extension of the mounting channel, which is bounded along the mounting axis on both sides inside the housing, to fix a position of the mounting bushing relative to the housing along the mounting axis, wherein the extension of the mounting channel is formed between ends of the two housing parts facing one another along the mounting axis.

6. The bearing according to claim 5, further comprising:
   a hollow cylindrical first sliding member provided in the mounting channel between the housing and the mounting bushing, wherein the first sliding member has a first sliding member projection with which it is arranged in a first portion of the extension of the mounting channel to fix a position of the first sliding member relative to the housing along the mounting axis; and
   a second sliding member provided in the mounting channel offset from the first sliding member along the mounting axis, the second sliding member having a second sliding member projection with which it is arranged in a second portion of the extension of the mounting channel to fix a position of the second sliding member relative to the housing along the mounting axis.

7. The bearing according to claim 6, wherein the first sliding member is arranged in the first portion of the mounting channel formed by the first housing part and the second sliding member is arranged in the second portion of the mounting channel formed by the second housing part.

8. The bearing according to claim 1, wherein the mounting channel is spaced equidistantly in the longitudinal direction from the two rollers, wherein the mounting channel is arranged on the same side of the receiving channel as the roller axles.

9. The bearing according to claim 1, wherein at least one of the sliding elements is arranged in each longitudinal end portion of the passageway.

10. The bearing according to claim 1, wherein the running surfaces of the rollers each have a concave contour facing the receiving channel, the concave contour has a cross-section perpendicular to the longitudinal direction that forms a segment of a sphere.

11. The bearing according to claim 1, wherein the sliding elements enclose the longitudinal axis of the passageway with an enclosure angle of at least 220°.

12. The bearing according to claim 1, wherein the passageway completely encloses the longitudinal axis perpendicular to the longitudinal direction over an angular range of at least 220° and has a longitudinally continuous opening on a side facing perpendicular to the longitudinal direction.

13. The bearing according to claim 1, wherein the sliding elements have grooves running in the longitudinal direction.

14. The bearing according to claim 1, wherein the roller axles run parallel to the mounting axis.

15. The bearing according to claim 1, wherein the sliding elements are made from a tribological polymer and/or the housing is made from a metal or a metal alloy.

16. The bearing according to claim 1, wherein at least one of the sliding elements is arranged in each longitudinal end portion of the passageway and is arranged closer to an absolute longitudinal end of the housing associated therewith than the roller lying closest thereto in the longitudinal direction.

17. A bearing assembly comprising the bearing according to claim 1 and a rail with a guide portion configured in the manner of a cylinder, wherein the guide portion is arranged so as to be displaceable in the passageway of the bearing in the longitudinal direction, and bears against both rollers perpendicular to the longitudinal direction and is spaced from the sliding elements perpendicular to the longitudinal direction by less than 0.5 mm.

18. The bearing assembly according to claim 17, further comprising a further bearing according to claim 1, wherein the bearings are arranged next to one another in the longitudinal direction and the guide portion is arranged in the passageways of the bearings and the bearings are each fastened to a structural member by way of a mounting peg arranged in a respective mounting channel and/or a mounting bushing arranged in the respective mounting channel.

* * * * *